(12) United States Patent
Low et al.

(10) Patent No.: US 6,404,626 B1
(45) Date of Patent: Jun. 11, 2002

(54) INTEGRATED CONNECTOR MODULE FOR PERSONAL COMPUTERS

(75) Inventors: Chor Leng Low; Hai Huang, both of Singapore (SG)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/350,507

(22) Filed: Jul. 9, 1999

(51) Int. Cl.[7] .................................................. G05F 1/16
(52) U.S. Cl. ...................... 361/686; 361/737; 439/928.1
(58) Field of Search ........................ 361/679, 683–686, 361/737, 749, 727; 439/928.1, 131, 946

(56) References Cited

U.S. PATENT DOCUMENTS 6,125,034 A * 9/2000 Bovio et al. ................ 361/686
6,129,566 A * 10/2000 Davis et al. ................ 439/131

* cited by examiner

*Primary Examiner*—Darren Schuberg
*Assistant Examiner*—Yean Hsi Chang
(74) *Attorney, Agent, or Firm*—Conley, Rose & Tayon, P.C.

(57) ABSTRACT

A built-in integrated connector module for a portable computer includes a support plate that attaches to a mini-PCI card and two communication jacks. Electronic interconnection such as a flex cable or wiring is provided between the jack and the mini-PCI card. The entire module is secured in supporting structures provided within the housing of a portable computer such that the module may be installed reliably and conveniently.

25 Claims, 7 Drawing Sheets

INTEGRATED CONNECTOR MODULE FOR PERSONAL COMPUTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to the miniaturization of personal computers. In particular, the present invention relates to the installation and use of mini-PCI cards in portable computers.

2. Background of the Invention

One of the most important features available on personal computers (PC's) is the ability to connect the personal computer to external communication networks. By connecting to external communication networks, such as telephone lines and computer networks, personal computers can transmit data to, and receive data from, other remotely-located computers. In conventional desktop computers, one or more computer cards or modules provide this communication function. The computer cards typically mount in an expansion bay of the computer and connect to a PCI (Peripheral Component Interconnect) connector or to some other bus standard connector (such as, for example, an Extended Industry Standard Architecture bus connector) provided in the desktop computer. The computer card includes circuitry and a connector for interfacing with a particular external communication network. Thus, for example, a card that interfaces with a telephone line includes a modem and a connector (or telephone jack) that mates with an appropriate telephone cable to couple the computer to a telephone line. The modem translates signals appearing on the telephone line to a format and protocol that can be understood by the computer, and similarly, converts signals from the computer to a format and protocol that can be transmitted over the telephone lines. Other computer cards also are available for interfacing the personal computer to other communication networks such as a local area network (LAN) using an Ethernet connector. In conventional desktop systems, these other computer cards can be mounted in other slots in the expansion bay.

Portable computers are being produced with ever increasing functions, and in ever smaller packages. Portable computers typically provide telecommunication and networking functions through peripheral cards. Such cards usually connect to the motherboard via a Peripheral Component Interconnect (PCI) bus. The PCI card mounts in a PCI bus slot, while the external connector or jack usually is soldered directly onto the printed circuit motherboard. Recently, mini-PCI cards have been developed in which interconnection modules for connecting to peripheral telecommunication lines may be integrated into the portable computer housing and chassis as built-in features.

Like the desktop computer, an important feature for portable computers is the ability to connect the portable computer to external communication networks, such as telephone lines and computer networks. Unlike desktop computers, however, space is at a premium in portable computers, and thus rarely is enough space available in a portable computer to permanently install circuitry and a connector for connecting to both a telephone line and a computer network.

A Mini-PCI card has been developed in which interconnection to both telephone lines and a local area network (LAN) are supported. However, due to the limited space within the housing of the portable computer, it is a challenging task to allocate space to accommodate the two communication jacks needed for interfacing with the external communication networks, especially when the necessity of a reliable and sturdy mechanical support is considered. The traditional method of soldering onto the motherboard needs to be improved, as this method does not give long term reliability when the user repeatedly plugs and unplugs the connections during usage. It would be more desirable to have a built-in interconnection in a portable computer which can be produced as a hardware module to facilitate repairs and replacements.

BRIEF SUMMARY OF THE INVENTION

The preferred embodiment of the present invention includes a built-in interconnection module for a portable computer. The interconnection module preferably includes multiple connectors for mating with several external communication networks. The interconnection module mounts compactly within the housing of a portable computer with sufficient mechanical support to ensure long-term reliability.

According to the preferred embodiment of the present invention, the interconnection module provides a support plate and a riser board for supporting a mini-PCI card and the communication jack or jacks. A flex cable or wiring electrically connects the jacks and the mini-PCI card. The support board supports the riser board, which includes a connector assembly for coupling the PCI card to the system motherboard. The entire interconnection module may be reliably and conveniently fitted into supporting structures provided within the housing of a portable computer.

In the preferred embodiment, a mini-PCI card, having a modem or an integrated modem and LAN interconnect, attaches to the riser board and the supporting plate. A flex cable effectively interfaces the mini-PCI card and the RJ11 and RJ45 jacks to minimize the space requirement such that the jacks and the flex cable may be fitted and secured into the computer housing in a space only fractionally larger than the size of the jacks. The riser board includes a connector assembly that couples the mini-PCI card to the motherboard. This modular system not only provides integration using very limited space, but also allows for ease of installation, replacement and repair, since no screws, nuts or bolts are required.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device "couples" to a second device, that connection may be through a direct electrical connection, or through an indirect electrical connection via other devices and connections.

DESCRIPTION OF THE PREFERRED EMBODIMENT

In the following description, numerous specific details are set forth such as specific parts of supporting structures of the housing and electronic interfaces for the integrated connector module in order to provide a thorough understanding of the present invention. Before addressing the specific details of the integrated connector module, a general overview of a computer system is provided. It should be understood that this overview is not intended to limit the scope of the present invention, and thus the integrated connector module described herein can be used in other computer architectures and designs without departing from the principles of the present invention. In addition, one skilled in the art will understand that certain computer system components have been omitted in the following discussion so as not to digress unnecessarily from the focus of the present invention.

Figure 4:
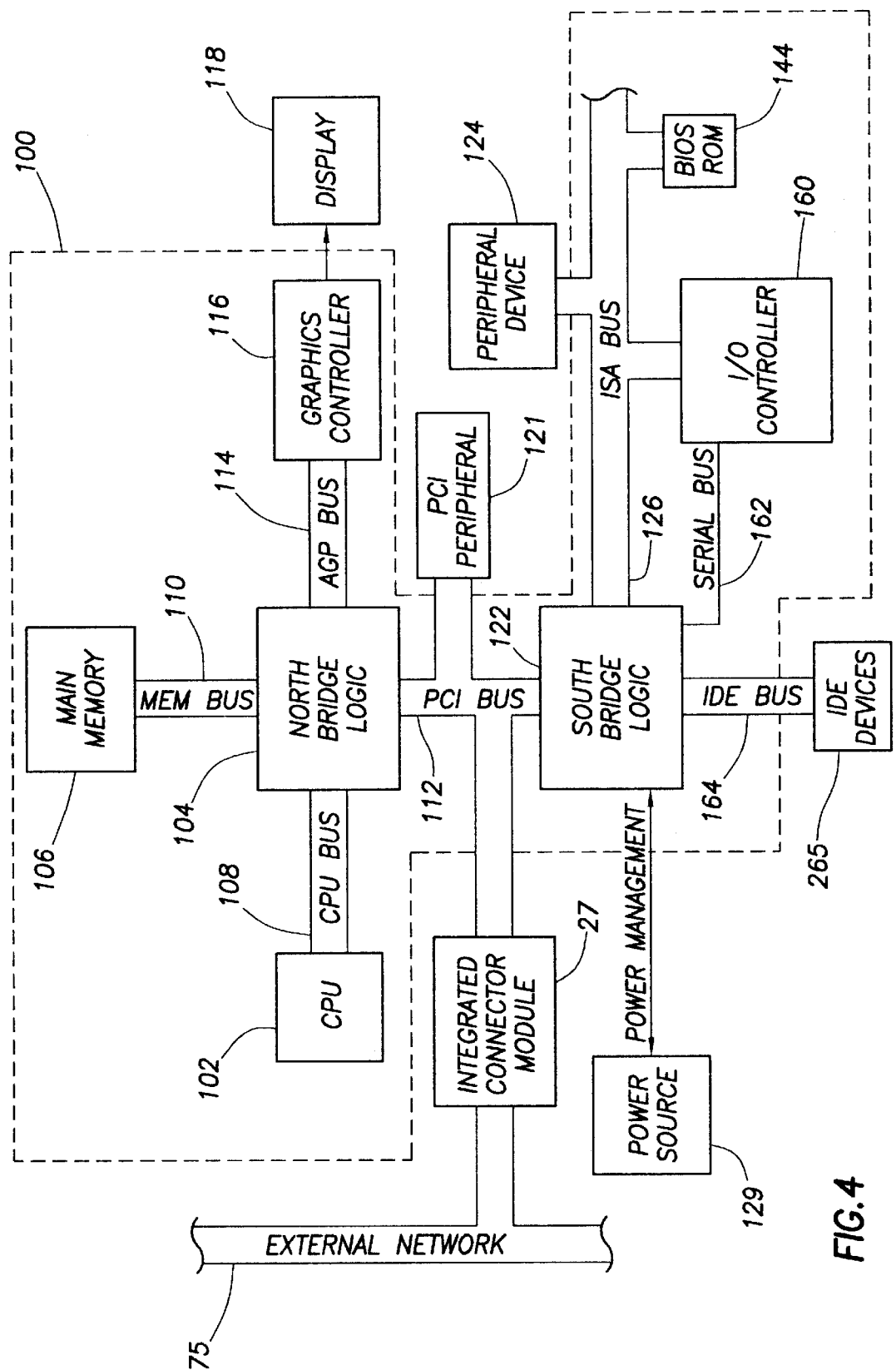
FIG. 4 is a block diagram generally illustrating the computer system of the present invention, constructed in accordance with the preferred embodiment.

A computer system may be configured in any number of ways, including as a laptop unit, a desktop unit, a network server, or any other configuration. Referring initially to FIG. 4, and in accordance with normal convention, a computer system generally includes a central processing unit (CPU) 102 coupled to a main memory array 106 and to a variety of other peripheral computer system components through an integrated bridge logic device 104. The bridge logic device 104 is sometimes referred to as a "North bridge" primarily because it often appears at the upper end of a computer system drawing. The CPU 102 preferably couples to North bridge logic 104 via a CPU bus 108, or the bridge logic 104 may be integrated into the CPU 102. The CPU 102 may comprise, for example, a Pentium® III microprocessor. It should be understood, however, that the computer system could include other alternative types of microprocessors. Further, an embodiment of the computer system may include a multiple-CPU architecture, with each processor coupled to the bridge logic unit 104. An external cache memory unit (not shown) may also couple to the CPU bus 108 or directly to the CPU 102.

The main memory array 106 preferably couples to the bridge logic unit 104 through a memory bus 110, and the bridge logic 104 preferably includes a memory control unit (not shown) that controls transactions to the main memory 106 by asserting the necessary control signals during memory accesses. The main memory 106 functions as the working memory for the CPU 102 and generally includes a conventional memory device or array of memory devices in which program instructions and data are stored. The main memory array may comprise any suitable type of memory such as dynamic random access memory (DRAM) or any of the various types of DRAM devices such as synchronous dynamic random access memory (SDRAM), extended data output dynamic random access memory (EDO DRAM), or Rambus™ dynamic random access memory (RDRAM).

The North bridge 104 couples the CPU 102 and memory 106 to the peripheral devices in the system through a Peripheral Component Interconnect (PCI) bus 112 or other expansion bus, such as an Extended Industry Standard Architecture (EISA) bus. The present invention, however, is not limited to any particular type of expansion bus, and thus various buses may be used, including a high speed PCI bus. Various peripheral devices 121 that implement the PCI protocol may reside on the PCI bus 112, as well. The PCI devices may include any of a variety of peripheral devices such as, for example, video accelerators, audio cards, hard or floppy disk drives, Small Computer Systems Interface (SCSI) adapters and the like.

The computer system also preferably includes a graphics controller 116 that couples to the bridge logic 104 via an expansion bus 112. As shown in FIG. 4, the expansion bus 112 comprises an Advanced Graphics Port (AGP) bus. Alternatively, the graphics controller 116 may couple to bridge logic 104 through the PCI bus 112. As one skilled in the art will understand, the graphics controller 116 controls the rendering of text and images on a display device 118. The graphics controller 116 may embody a typical graphics accelerator generally known in the art to render three-dimensional data structures on display 118. These data structures can be effectively shifted into and out of main memory 106 via the expansion bus 114 and bridge logic 104. The graphics controller 116 therefore may be a master of the expansion bus (including either PCI or AGP bus) enabling the graphics controller 116 to request and receive access to a target interface within the bridge logic unit 104, including the memory control unit. This mastership capability permits the graphics controller 116 to access main memory 106 without the assistance of the CPU 102.

As will be apparent to one skilled in the art, the bridge logic 104 includes a PCI interface to permit master cycles to be transmitted and received by bridge logic 104. The bridge logic 104 also includes an interface for initiating and receiving cycles to and from components on the AGP bus 114. The display 118 comprises any suitable electronic display device upon which an image or text can be represented. A suitable display device may include, for example, a liquid crystal display (LCD), a thin film transistor (TFT), a virtual retinal display (VRD), or any other type of suitable display device for a computer system.

In accordance with preferred embodiment, the computer system includes an integrated connector module 27 coupled to the PCI bus 112. The integrated connector module 27 preferably installs permanently within the computer system and couples the computer system to one or more external communication networks 75.

The computer system also may include a Personal Computer Memory Card International Association (PCMCIA)

drive (not shown) coupled to the PCI bus 112. The PCMCIA drive is accessible from the outside of the computer and accepts one or more expansion cards that are housed in special PCMCIA cards, enclosures which are approximately the size of credit cards but slightly thicker. Accordingly, PCMCIA ports are particularly advantageous in laptop computer systems, in which space is at a premium. A PCMCIA card typically includes one connector that attaches to the PCMCIA drive, and additional connectors may be included for attaching cables or other devices to the card outside of the computer. Accordingly, various types of PCMCIA cards are available, including memory expansion cards.

If other secondary expansion buses are provided in the computer system, another bridge logic device typically couples the PCI bus 112 to that expansion bus. This bridge logic is sometimes referred to as a "South bridge," reflecting its location vis-á-vis the North bridge in a typical computer system drawing. In FIG. 4, the South bridge 122 couples the PCI bus 112 to an Industry Standard Architecture (ISA) bus 126 and to an Integrated Drive Electronics (IDE) bus 164. The IDE bus 164 typically interfaces input and output devices such as a CD ROM drive, a Digital Video Disk (DVD) drive, a hard disk drive, and one or more floppy disk drives. Various ISA-compatible devices are shown coupled to the ISA bus 126, including a BIOS ROM 144. The BIOS ROM 144 is a memory device that stores commands that instruct the computer how to perform basic functions such as sending video data to the display or accessing data on hard and floppy disk drives. In addition, the BIOS ROM 144 may be used to store power management instructions for hardware-based (or "legacy") power management systems or to store register definitions for software-based power management systems. The BIOS instructions also enable the computer to load the operating system software program into main memory during system initialization, also known as the "boot" sequence. The BIOS ROM 144 typically is a "nonvolatile" memory device, which means that the memory contents remain intact even when the computer 100 powers down. By contrast, the contents of the main memory 106 typically are "volatile" and thus are lost when the computer shuts down.

The South bridge 122 preferably supports an input/output (I/O) controller 160 that operatively couples to basic input/output devices such as a keyboard (not shown), a mouse (not shown), a floppy disk drive (not shown), general purpose parallel and serial ports (not shown), and various input switches such as a power switch and a sleep switch (not shown). The I/O controller 160 typically couples to the South bridge via a standard bus, shown as the ISA bus 126 in FIG. 4. A serial bus 162, which generally is a bus with only one data signal, may provide an additional connection between the I/O controller 160 and South bridge 122. The I/O controller 160 typically includes an ISA bus interface (not specifically shown) and transmit and receive registers (not specifically shown) for exchanging data with the South bridge 122 over the serial bus 162.

In accordance with normal convention, the computer system includes a power source 129 for providing operating power to each of the electrical components within the system. If used in a portable computer, the power source 129 preferably includes a battery and a power converter for converting standard ac voltages to regulated dc voltage. Under the operating system control, the South bridge or other component within the computer system typically manages power functions using the Advanced Configuration and Power Interface (ACPI) protocol. Power management functions include, for example, reducing or terminating power to components such as the floppy drive, gating the clock signals that drive components such as the North bridge 104 and CPU 102, and initiating sleep mode transitions on the peripheral buses 112 and 126.

Referring still to FIG. 4, many of the computer system components physically reside on the system motherboard 100. Alternatively, some of the components that are shown as part of the motherboard 100 may reside on modules that plug-in to the motherboard. Thus, for example, the CPU 102 and North bridge logic 104 may reside on a separate module that plugs-in to the motherboard 100, instead of being directly mounted on the motherboard. In accordance with normal convention, the motherboard typically includes a number of sockets that couple to one or more of the various system busses, such as the PCI bus 112. These sockets permit peripheral devices to be coupled to the motherboard 100.

Figure 1A:
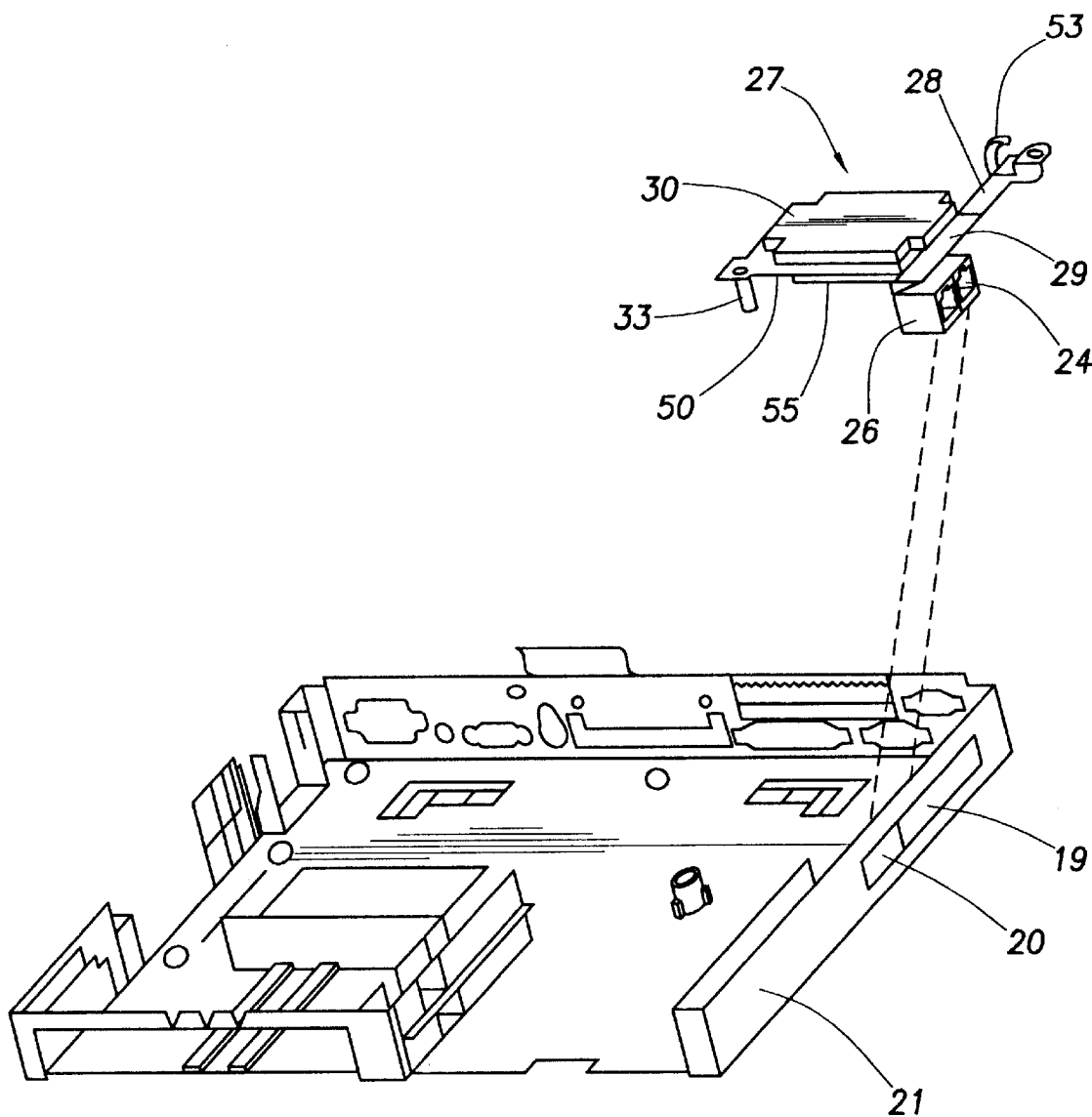
FIG. 1A is an elevated perspective view illustrating the integrated connector module and the computer housing according to the preferred embodiment of the present invention.
Figure 5:
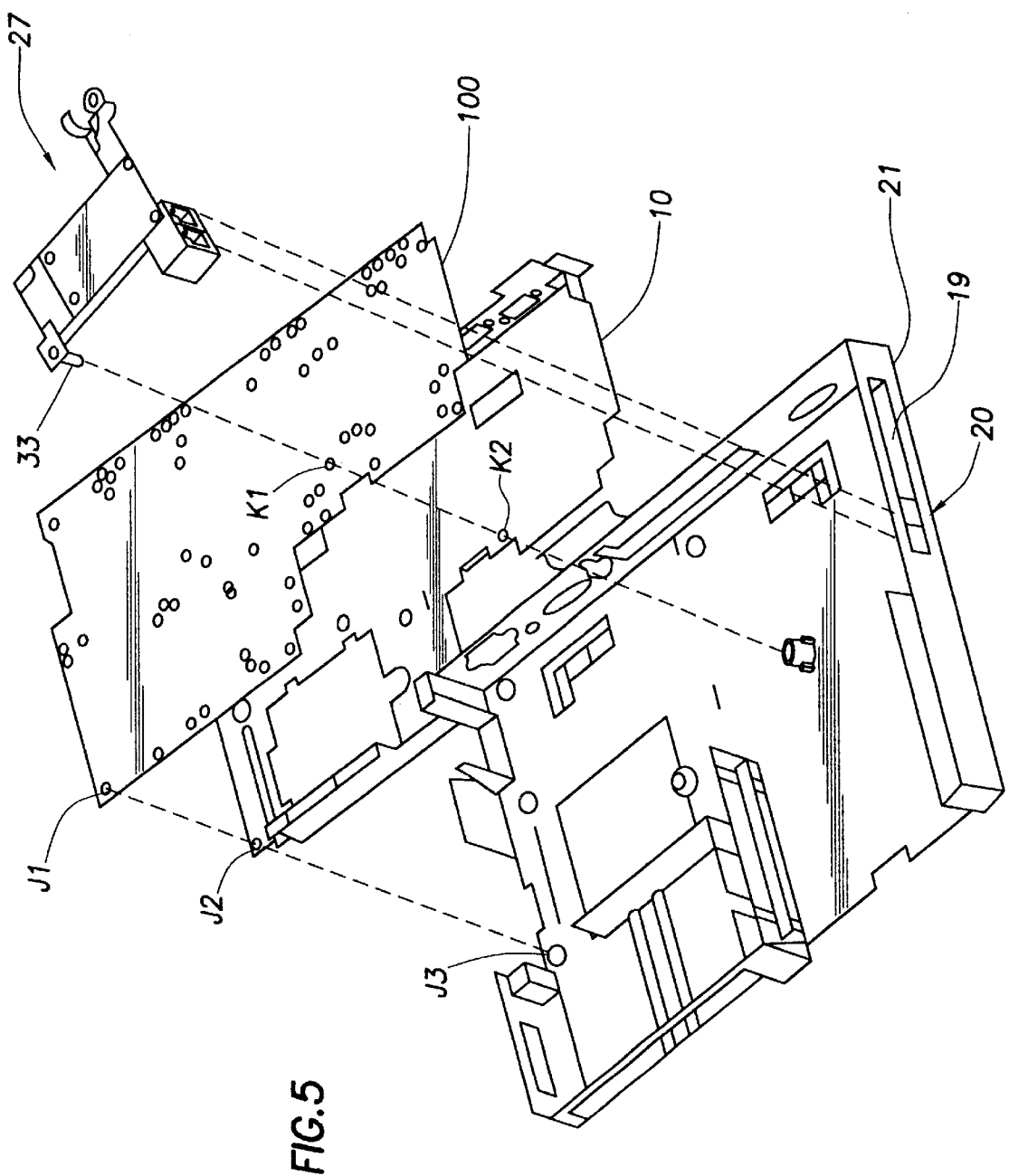
FIG. 5 is an exploded perspective view illustrating the manner in which the interconnection module is attached to the system motherboard and chassis.

Referring now to FIG. 1A and FIG. 5, the integrated connector module 27 preferably mounts to a lower portion or bottom half of a portable computer housing 21. In accordance with normal convention, the computer motherboard 100 and other standard computer components are secured to the bottom half of the portable computer housing 21. As shown in FIG. 5, the computer chassis 10, which comprises a section of sheet metal, is positioned between the motherboard 100 and the housing 21. The motherboard 100 and chassis 10 attach to the housing 21 at point J3 by a threaded screw that extends through the motherboard 100 and chassis 10 at locations J1 and J2, respectfully. According to the preferred embodiment, the bottom half of the computer housing 21 includes a side opening 20 and a card bus opening 19. As shown in FIGS. 1A and FIG. 5, the card bus opening 19 and side opening 20 are adjacently positioned on the right side of the computer housing, although one skilled in the art will understand that the opening 20 need only be positioned relative to the integrated connector module 27, and thus need not be located at any specific location on the computer housing. The card bus opening 19 has a sufficient height and width to receive a PC card. The side opening 20 preferably provides access to two jacks, and thus the side opening 20 has a configuration specifically selected to accommodate the external connectors that mate with the jacks. In the most preferred embodiment, the height of this side opening 20 is the same as that of the card bus opening 19 for aesthetic reasons.

Referring still to FIG. 1A, the integrated connector module 27 preferably includes an RJ11 jack 24, an RJ45 jack 26, a riser board 50, support plate 28, flex cable 29 and a mini-PCI card 30 for the telephone and local area network interconnection. As shown in FIGS. 1A and 5, the support plate 28 preferably includes a standoff 33, which is adapted to receive a screw for attaching the support plate 28 to the chassis 10. Standoff 33 attaches to motherboard 100 and chassis 10 at locations K1 and K2, respectively. The dashed lines in FIGS. 1A and 5 show the manner in which the integrated connector module 27 is secured to the motherboard 100, chassis 10, and housing 21.

Figure 1B:
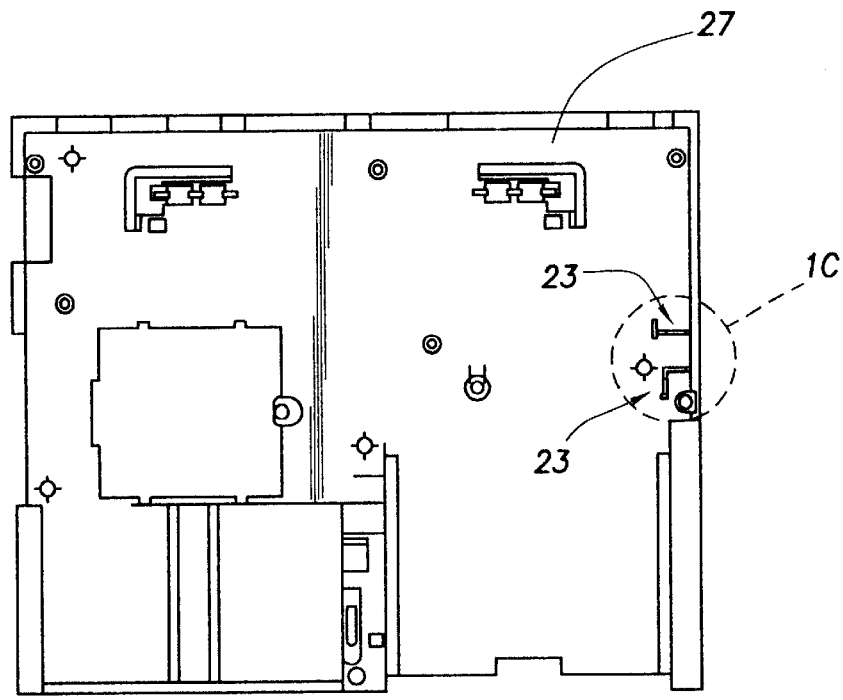
FIG. 1B is a plan view of the computer housing of FIG. 1A.
Figure 1C:
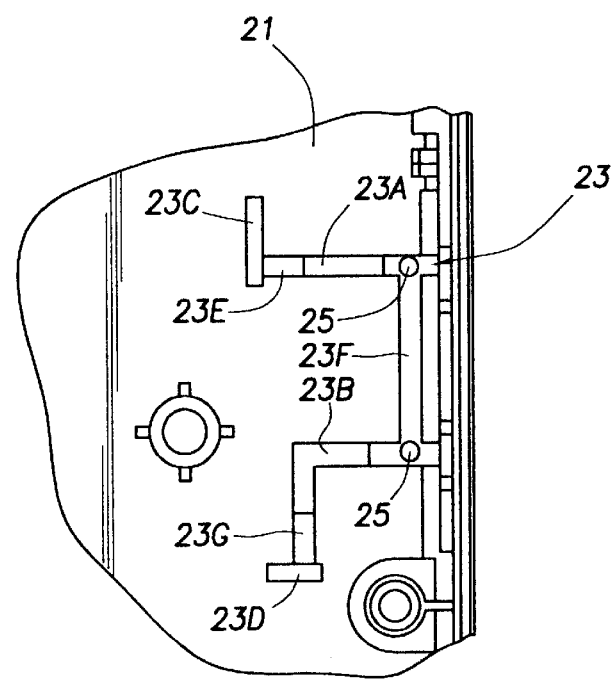
FIG. 1C is an enlarged plan view of area G of FIG. 1B.

Referring now to FIGS. 1B and 1C, the bottom half of housing 21 preferably includes supporting structures for receiving the integrated connector module 27, including ridges 23A–F that extend from the bottom of housing 21. The height of the different sections of the ridges 23 vary according to their function. The height of sections 23A and 23B are low, and are designed to accommodate the metallic pins 34 extending from the bottom of the jacks. The height of sections 23E, 23F and 23G are level with the height of the bottom of the jacks, and are designed to support the bottom of the jacks where the metallic pins are absent. Sections 23C and 23D serve as braces for the side and back of the jacks to absorb any lateral forces exerted on the jacks. The entire integrated connector module 27 can be mounted on the lower portion of the computer housing 21 by sliding the jacks 24, 26 within ridge sections 23C and 23D, with standoff 33 resting on the chassis 10 (as shown in FIG. 5). The integrated connector module 27 is then fixed into position by screwing the standoff 33 onto the chassis 10, and fastening the top housing to the bottom housing. Two positioning pins 25 are provided on ridges 23 for interaction with the integrated connector module 27. As will be described more fully below in relation to FIGS. 2C and 2F, the positioning pins 25 are inserted into openings in the flex cable 29 for supporting the flex cable 29 and the jacks 24, 26.

Figure 3B:
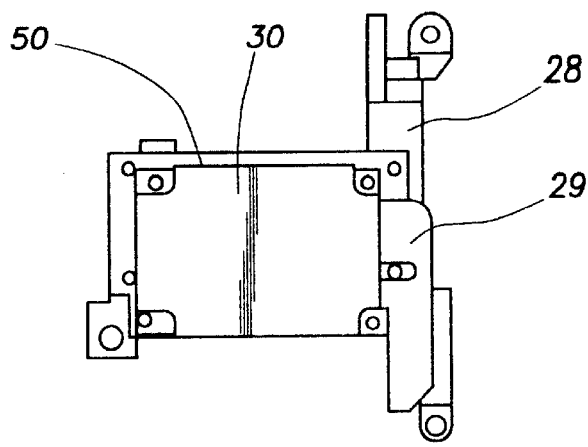
FIGS. 3A–D are right, top, front and bottom views respectively of the integrated connector module of FIG. 1A.
Figure 3C:
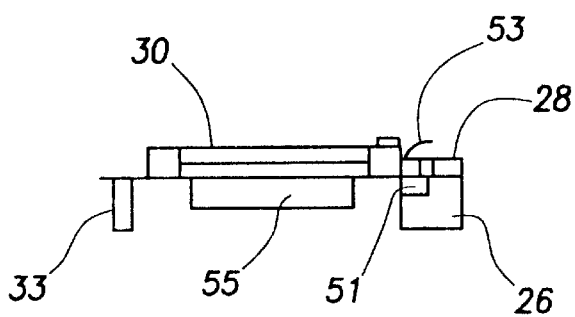
Figure 3A:
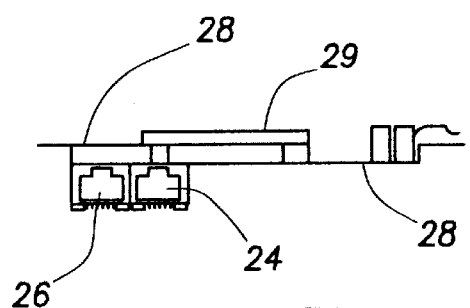
Figure 3D:
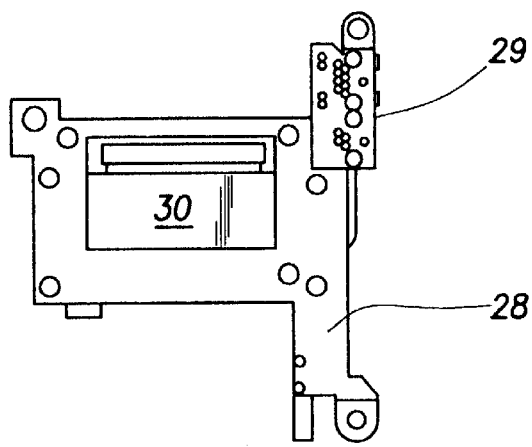
Figure 6:
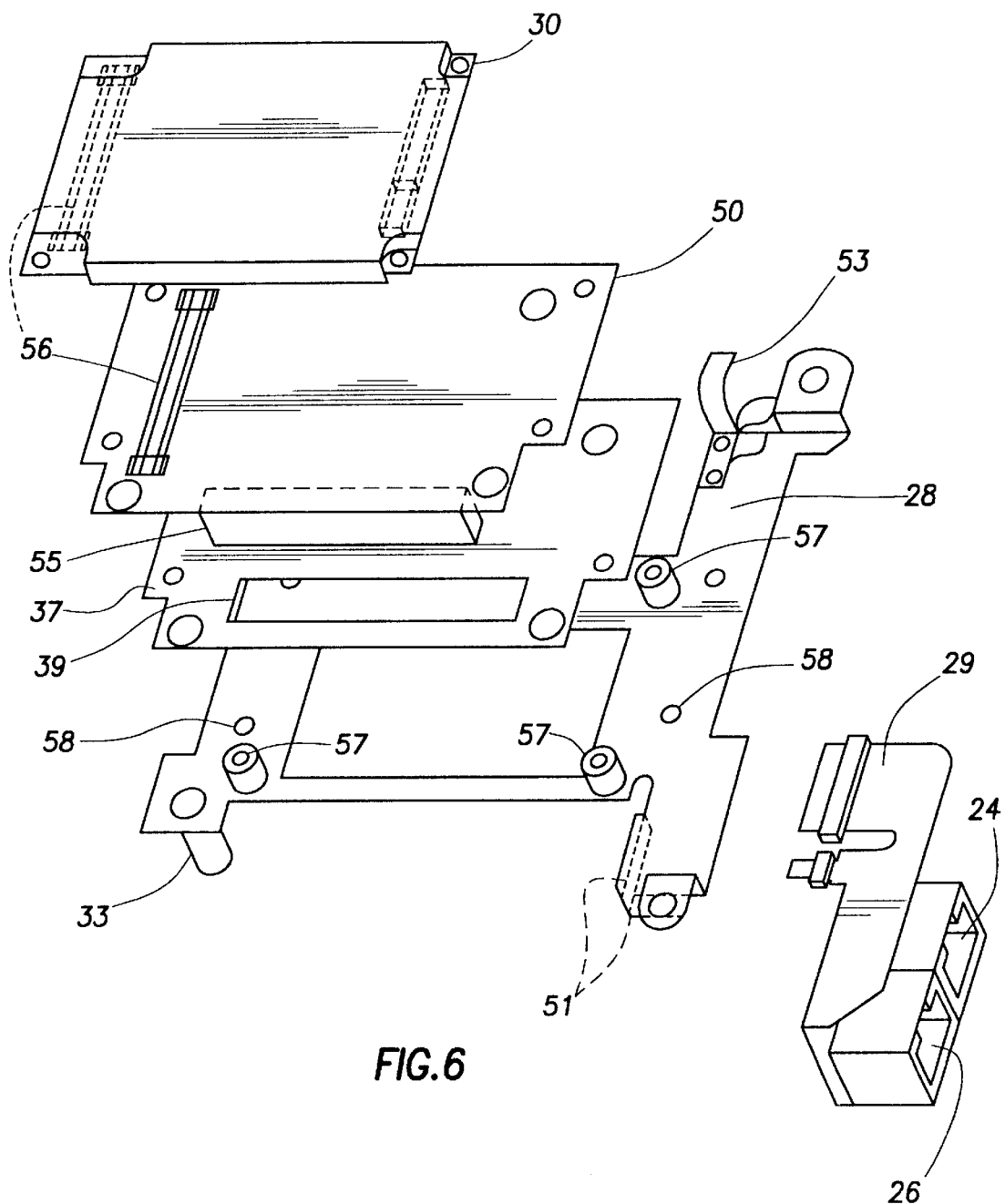
FIG. 6 depicts an exploded perspective view of the riser board and PC card of FIGS. 3A–D.

The integrated connection module will now be described in greater detail with reference to FIGS. 3A–D and FIG. 6. As best seen in FIG. 3A, jacks 24 and 26 are positioned adjacent each other to minimize the amount of space. The upper portion of the flex cable 29 wraps around and above a portion of the support plate 28 from the back of jacks 24, 26. As seen in FIG. 6, three standoffs 57 are provided on support plate 28. The mini PCI card 30 is secured to the standoffs 57 by screws that extend through apertures on the riser board 50 and insulating layer 37. The mini-PCI card 30 couples electrically to a connector assembly on the riser board 50. In the preferred embodiment, a BTB Connector 56 electronically connects the riser board 50 to the PCI card 30. The jacks 24, 26 are also provided with spring clips (not shown) extending from the top of the jacks to provide EMI grounding. In this embodiment, the support plate 28 is constructed from conductive metallic material, which directly contacts the spring clips extending from the jacks, and thus further serves as a grounding connection (in addition to providing mechanical support). The support plate 28 preferably includes a clip 53 that connects electrically to the keyboard pan (not shown) to reduce electromagnetic interference. In the preferred embodiment, the support plate 28 includes two tabs 51 extending downwardly at the back of the two jacks 24, 26 to provide additional mechanical support. As best seen in FIG. 3C and FIG. 6, the riser board 50 includes a lower plug connector 55 that extends downwardly from the riser board 50, through a slot 39 in insulating layer 37. Referring to FIGS. 1A and 6, when the support plate 28 is properly positioned in the housing of the computer, the lower plug connector 55 of the riser board 50 electrically connects to the motherboard 100 (FIG. 5) when the module 27 is properly fitted into the housing 21.

Figure 2A:
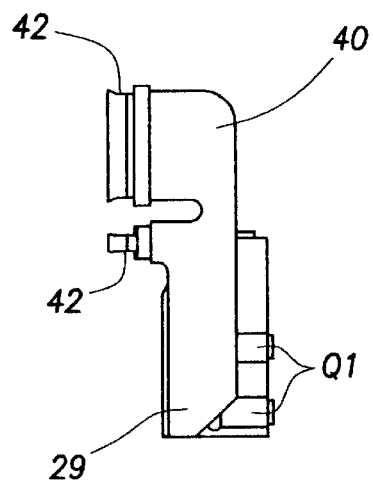
FIGS. 2A–E are top, front, bottom, left and right views, respectively, of the double jack with the flex cable constructed in accordance with the preferred embodiment.
Figure 2D:
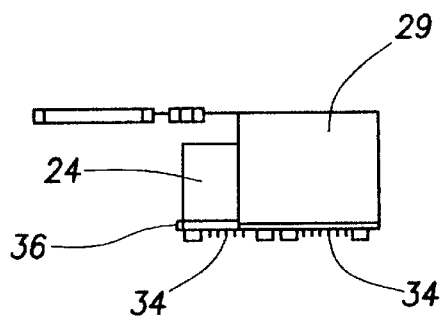
Figure 2B:
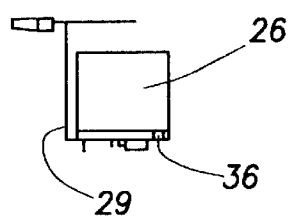
Figure 2E:
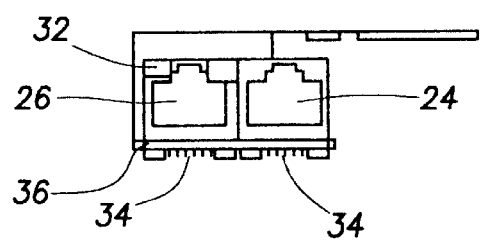
Figure 2C:
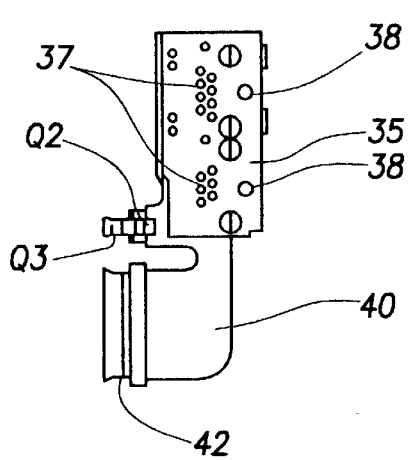
Figure 2F:
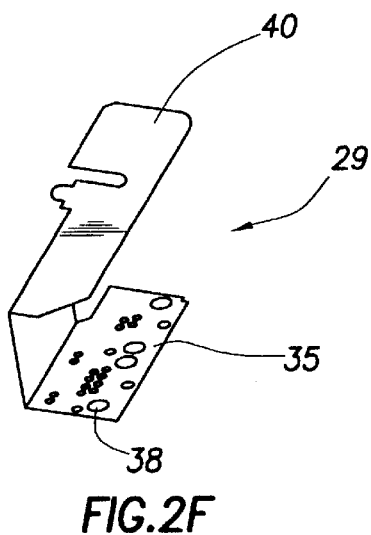
FIG. 2F is the elevated view of the flex cable alone.

Referring now to FIGS. 2A–F, the manner in which jacks 24, 26 attach to the flex cable 29 will now be described in greater detail. The two jacks 24, 26 preferably are adjoined side-by-side to form a double jack, with LED 32 positioned above the RJ45 jack, and metallic pins 34 extending from the bottom of the jacks 24, 26. Jacks 24 and 26 preferably are secured to support plate 28 using adhesive paste, such as 3M 444 adhesive. The metallic pins 34 are inserted into openings in the flex cable 29 and electrically connect the jacks 24, 26 to flex cable 29. In the preferred embodiment a piece of stiffener 36 and the corresponding end of flex cable 29 are laminated together by a modified acrylic adhesive. The stiffener 36 preferably is comprised of a dielectric material, such as FR4, with an approximate thickness of 1.5 mm. The two jacks 24, 26 are then mounted onto the flex-stiffener laminate which has access holes 37 through which the metallic pins 34 from the bottom of the jacks extend. The metallic pins 34 preferably are soldered onto the flex cable 29 to ensure a proper electrical connection. In addition, two other openings 38 are provided through which the plastic positioning pins 25 (shown in FIG. 1C) on the ridges of the housing 21 are inserted. The positioning pins 25 thus serve as positional guides and mechanically support the jacks 24, 26 by limiting lateral movement of the jacks once they are installed. The flex cable 29 bends at 90 degrees around the back and top of the jacks 24, 26, such that the flex cable 29 occupies a minimum amount of space. The second end 40 of the flex cable 29 contains the pin connector actuators and pin housing 42 for interfacing with the PCI card 30. As shown in FIG. 2C, part Q2 comprises a piece of 3M epoxy 460 applied between a modem connector housing Q3 and the flex cable 29 to enhance the unmated strength of the connection. The electrical wiring in the flex cable 29 is designed to turn 180 degrees at the top of the jacks since the mini PCI card is positioned behind the jacks.

While the present invention has been described particularly with references to the aforementioned figures with emphasis on an interconnect module for a double jack consisting of the RJ11 and RJ45 jacks, it should be understood that the figures are for illustration only and should not be taken as limitation on the invention. For example, although flex cable is the most preferred means for interconnecting the jack and the mini-PCI card, other electronic connections, such as wiring connection, are considered equivalents. In the case of wire connection, a wire connector would be needed as an interface, and more space is required. The wires are preferably clipped or contained together for ease of installation. Wire connections would reduce the overall cost of the module, provided that there is sufficient space in the computer. Similarly, connectors other than RJ11 and RJ45 jacks may be used to connect to other external communication networks, as desired.

It is clear that the method and apparatus of the present invention has utility in many applications where built-in interconnection for peripheral functions is required. For example, if mini-PCI cards are available for interconnection with a video camera, DVD player or other audio or visual equipment, then the appropriate jacks for these functions may also integrated into the portable computer using the teachings provided herein. It is contemplated that many changes and modifications may be made by one of ordinary skill in the art without departing from the spirit and the scope of the invention described.

The invention claimed is:

1. An integrated connector module for mounting in a computer housing, comprising:
   at least one communication jack that includes a front face capable of mating with an external communication network, said communication jack including metallic pins extending therefrom, and wherein the communication jack includes a top, back and bottom surface, and said metallic pins extend from the bottom surface of said communication jack; and;
   a flex cable with a first end and a second end, with the first end of said flex cable soldered to said metallic pins to form an electrical connection with said communication jack, and the second end of said flex cable includes a PCI card connector capable of connecting to a PCI card; and
   wherein said flex cable is configured to wrap around the back and top surfaces of said communication jack.

2. An integrated connector module as in claim 1, further comprising a support plate that extends between the top surface of said communication jack and said flex cable.

3. An integrated connector module as in claim 2, further comprising a riser board attached to said support plate, said riser board extending generally parallel to said PCI card connector for supporting a PCI card.

4. An integrated connector module as in claim 3, wherein said riser board includes a connector assembly coupling the PCI card to a motherboard mounted within the computer housing.

5. An integrated connector module as in claim 4, wherein said riser board connector assembly includes a first connector that connects electrically to the PCI card, and a second connector that extends from said riser board to connect to the motherboard.

6. An integrated connector module as in claim 4, wherein said support board includes a standoff that attaches to the computer housing.

7. An integrated connector module as in claim 2, wherein said PCI card connector extends in a direction substantially opposite the front face of said communication jack.

8. An integrated connector module as in claim 2, wherein said at least one communication jack comprises two communication jacks that are capable of mating with two different external communication networks.

9. An integrated connector module for mounting in a computer housing, comprising:
  at least one communication jack that includes a front face capable of mating with an external communication network, and a top, back and bottom surface, and said communication jack also includes metallic pins;
  a flex cable with a first end and a second end, with the first end of said flex cable soldered to said metallic pins to form an electrical connection with said communication jack, and the second end of said flex cable including a PCI card connector capable of connecting to a PCI card;
  a support plate that extends between the top surface of said communication jack and said flex cable; and
  a riser board attached to said support plate, said riser board extending generally parallel to said PCI card connector for supporting a PCI card.

10. An integrated connector module as in claim 9, wherein said metallic pins extend from the bottom surface of said communication jack, and said flex cable is configured to wrap around the back and top surfaces of said communication jack.

11. An integrated connector module as in claim 10, wherein said PCI card connector extends in a direction substantially opposite the front face of said communication jack.

12. An integrated connector module as in claim 11, wherein said riser board includes a connector assembly coupling the PCI card to a motherboard mounted within the computer housing.

13. An integrated connector module as in claim 12, wherein said riser board connector assembly includes a first connector that connects electrically to the PCI card, and a second connector that extends from said riser board to connect to the motherboard, and wherein said support board includes a standoff that attaches to the computer housing.

14. An integrated connector module as in claim 9, wherein said at least one communication jack comprises two communication jacks that are capable of mating with two different external communication networks through an opening in said computer housing.

15. A portable computer system, comprising:
  a housing that includes a top surface, a bottom surface, and four side walls, with at least one of the four side walls including an opening to permit connection to an external communication network;
  a central processing unit controlling the operation of said computer system;
  a motherboard mounted within said housing, said motherboard electrically connected to said central processing unit;
  a power source connected to said motherboard that supplies operating power to components on said motherboard and to said central processing unit;
  an integrated connector module that includes:
    at least one communication jack that includes a front face capable of mating with the external communication network through the opening in said side wall, said communication jack including metallic pins extending therefrom; and
    a flex cable with a first end and a second end, with the first end of said flex cable soldered to said metallic pins to form an electrical connection with said communication jack, and the second end of said flex cable includes a PCI card connector capable of connecting to a PCI card; and
  wherein said flex cable is configured to wrap around at least one surface of said communication jack to connect electrically to metallic pins extending through said at least one surface.

16. A portable computer system as in claim 15, wherein the bottom surface of said housing includes ridge sections for supporting said communication jack.

17. A portable computer system as in claim 16, wherein the communication jack includes a top, back and bottom surface, and said metallic pins extend from the bottom surface of said communication jack.

18. A portable computer system as in claim 17, wherein at least one of the ridge sections include a positioning pin, and said flex cable includes an opening for receiving said positioning pin.

19. A portable computer as in claim 18, wherein said PCI card connector extends in a direction substantially opposite the front face of said communication jack.

20. A portable computer system as in claim 19, wherein the integrated connector module also includes a support plate that extends between the top surface of said communication jack and said flex cable.

21. A portable computer as in claim 20, wherein the integrated connector module also includes a riser board attached to said support plate, with said riser board extending generally parallel to said PCI card connector for supporting a PCI card.

22. A portable computer as in claim 21, wherein said riser board includes a connector assembly coupling the PCI card to said motherboard.

23. A portable computer as in claim 22, wherein said riser board connector assembly includes a first connector that connects electrically to the PCI card, and a second connector that extends from said riser board to connect to said motherboard.

24. A portable computer as in claim 20, wherein said support board includes a standoff that attaches to the computer housing.

25. A portable computer as in claim 24, wherein said at least one communication jack comprises two communication jacks that are capable of mating with two different external communication networks.

* * * * *